US012563426B2

(12) United States Patent (10) Patent No.: US 12,563,426 B2
Borsos et al. (45) Date of Patent: Feb. 24, 2026

(54) TECHNIQUE FOR ASSESSING CONNECTION QUALITY

(71) Applicant: Telefonaktiebolaget LM Ericsson (publ), Stockholm (SE)

(72) Inventors: Tamas Borsos, Budapest (HU); András Rácz, Budapest (HU); András Veres, Budapest (HU)

(73) Assignee: Valea AB, Stockholm (SE)

( * ) Notice: Subject to any disclaimer, the term of this patent is extended or adjusted under 35 U.S.C. 154(b) by 338 days.

(21) Appl. No.: 18/023,835

(22) PCT Filed: Oct. 2, 2020

(86) PCT No.: PCT/EP2020/077697
§ 371 (c)(1),
(2) Date: Feb. 28, 2023

(87) PCT Pub. No.: WO2022/069061
PCT Pub. Date: Apr. 7, 2022

(65) Prior Publication Data
US 2024/0031841 A1 Jan. 25, 2024

(51) Int. Cl.
*H04W 24/08* (2009.01)
*H04W 24/10* (2009.01)
(52) U.S. Cl.
CPC ........... *H04W 24/08* (2013.01); *H04W 24/10* (2013.01)
(58) Field of Classification Search
None
See application file for complete search history.

(56) References Cited

U.S. PATENT DOCUMENTS

| | | | | |
|---|---|---|---|---|
| 8,958,755 B2 * | 2/2015 | Jung | ..................... | H04W 24/08 |
| | | | | 455/67.11 |
| 9,983,258 B2 * | 5/2018 | Zhang | ................ | G01R 31/2822 |
| 9,986,597 B2 * | 5/2018 | Mishra | ................. | H04B 17/309 |
| 10,109,168 B1 | 10/2018 | Devison et al. | | |
| 10,299,096 B2 * | 5/2019 | Ludlow | ............... | H04L 12/2838 |

(Continued)

FOREIGN PATENT DOCUMENTS

| | | |
|---|---|---|
| CN | 107852496 A | 3/2018 |
| CN | 107920355 A | 4/2018 |

(Continued)

OTHER PUBLICATIONS

International Search Report and Written Opinion of the International Searching Authority, PCT/EP2020/077697, mailed Jun. 16, 2021, 17 pages.

(Continued)

*Primary Examiner* — Melvin H Pollack
(74) *Attorney, Agent, or Firm* — Weisberg I.P. Law, P.A.

(57) ABSTRACT
A technique for assessing connection quality in a wireless communication network is disclosed. A method implementation of the technique includes obtaining a radio frequency, RF, channel response measurement indicative of a channel gain in time and frequency observed at a location covered by the wireless communication network, and determining, based on the RF channel response measurement, an estimated connection quality at the location using a machine learning model trained to map RF channel response measurement based features to corresponding connection qualities.

18 Claims, 11 Drawing Sheets

(56) References Cited

U.S. PATENT DOCUMENTS

| | | | |
|---|---|---|---|
| 10,313,039 B2 * | 6/2019 | Chung | H04B 17/318 |
| 10,333,807 B2 * | 6/2019 | Egner | H04L 43/14 |
| 10,462,808 B2 * | 10/2019 | Aijaz | H04L 12/189 |
| 10,901,066 B2 * | 1/2021 | Borsos | G01S 5/0284 |
| 10,931,338 B2 * | 2/2021 | Shattil | H04B 7/0632 |
| 11,003,179 B2 * | 5/2021 | Cella | G05B 23/0294 |
| 11,075,786 B1 * | 7/2021 | Shattil | H04B 7/024 |
| 11,125,850 B2 * | 9/2021 | Markhovsky | G01S 1/20 |
| 11,184,037 B1 * | 11/2021 | Shattil | H04B 1/0003 |
| 11,201,661 B2 * | 12/2021 | Venugopal | H04W 72/0453 |
| 11,255,945 B2 * | 2/2022 | Markhovsky | G01S 5/0231 |
| 11,271,699 B1 * | 3/2022 | Eyuboglu | H04L 1/1819 |
| 11,375,395 B2 * | 6/2022 | Wong | H04W 28/021 |
| 11,375,406 B2 * | 6/2022 | Poolsappasit | H04B 17/23 |
| 11,395,169 B2 * | 7/2022 | Zhang | H04W 24/10 |
| 11,496,273 B2 * | 11/2022 | Chung | H04B 7/06 |
| 11,500,056 B2 * | 11/2022 | Wu | G01S 5/06 |
| 11,516,051 B2 * | 11/2022 | Chandrasekhar | G01S 5/14 |
| 11,575,424 B2 * | 2/2023 | Yerramalli | H04W 76/27 |
| 11,616,550 B2 * | 3/2023 | Chung | H04B 7/0478 370/329 |
| 11,641,644 B2 * | 5/2023 | Badic | G05D 1/606 370/329 |
| 11,647,412 B2 * | 5/2023 | Kim | H04L 5/0023 370/329 |
| 11,695,524 B2 * | 7/2023 | Manolakos | H04L 5/0053 370/329 |
| 11,742,909 B2 * | 8/2023 | Hadani | H04B 7/024 375/267 |
| 11,828,865 B2 * | 11/2023 | Yerramalli | H04W 16/14 |
| 11,949,254 B2 * | 4/2024 | Choi | H04B 1/005 |
| 11,974,167 B2 * | 4/2024 | Kons | H04W 72/044 |
| 12,022,354 B2 * | 6/2024 | Duan | G01S 11/06 |
| 12,028,187 B2 * | 7/2024 | Song | G06N 20/00 |
| 12,047,123 B2 * | 7/2024 | Lee | H04L 69/324 |
| 12,082,023 B2 * | 9/2024 | Azarfar | H04W 48/20 |
| 12,082,202 B1 * | 9/2024 | Yeo | H04W 28/10 |
| 12,089,267 B2 * | 9/2024 | Lee | H04W 72/0453 |
| 12,133,121 B2 * | 10/2024 | Lee | H04W 48/20 |
| 12,160,381 B2 * | 12/2024 | Lee | H04L 5/0044 |
| 12,212,443 B2 * | 1/2025 | Kim | H04L 27/01 |
| 12,289,148 B2 * | 4/2025 | Rakib | H04B 7/0617 |
| 2013/0189977 A1 | 7/2013 | Brisebois et al. | |
| 2016/0165468 A1 * | 6/2016 | Gopalakrishnan | H04W 24/08 370/252 |
| 2020/0053591 A1 | 2/2020 | Prasad | |
| 2020/0182995 A1 | 6/2020 | Zeng et al. | |
| 2020/0348662 A1 * | 11/2020 | Cella | G05B 19/41865 |
| 2021/0136654 A1 * | 5/2021 | Tsai | H04W 40/04 |
| 2022/0077993 A1 * | 3/2022 | Hong | H04W 72/20 |
| 2023/0344505 A1 * | 10/2023 | Kim | H04W 56/0015 |

FOREIGN PATENT DOCUMENTS

| | | |
|---|---|---|
| EP | 3518467 A1 | 7/2019 |
| EP | 3585113 A1 | 12/2019 |
| WO | 2017044501 A1 | 3/2017 |
| WO | 2019034391 A1 | 2/2019 |
| WO | 2020190182 A1 | 9/2020 |

OTHER PUBLICATIONS

Office Action and Search Report mailed Aug. 12, 2024 for Chinese Patent Application No. 202080105736.9, 8 pages.

* cited by examiner

Fig. 1a

Computing unit

Processor — 102

Memory — 104

Computing unit

Processor — 112

Memory — 114

110

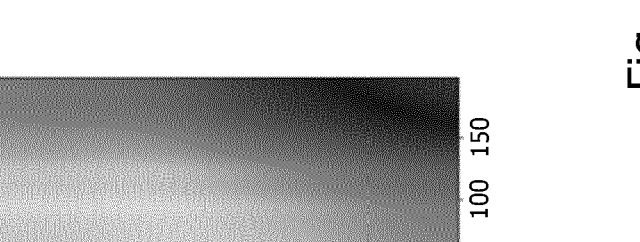
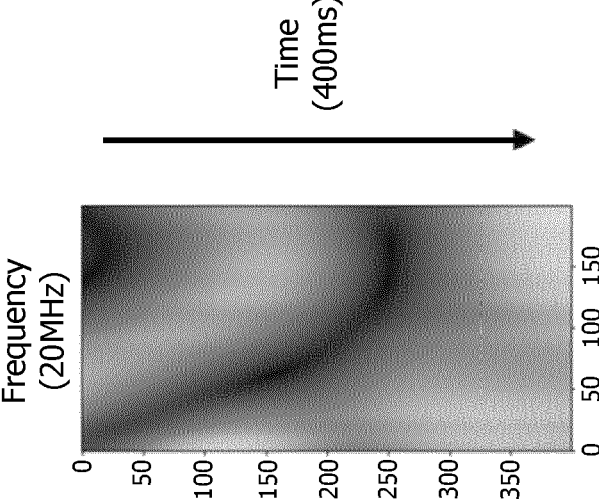
Fig. 6

S1002

Train a machine learning model using training data comprising a plurality of sets of RF channel response measurement based features as input data, the plurality of sets of RF channel response measurement based features being obtained from RF channel response measurements indicative of channel gain in time and frequency performed at different locations covered by a representative wireless communication network, and corresponding connection qualities measured at the different locations as output data

Fig. 10

TECHNIQUE FOR ASSESSING CONNECTION QUALITY

CROSS REFERENCE TO RELATED APPLICATIONS

This application is a 35 U.S.C. § 371 national stage application of PCT International Application No. PCT/EP2020/077697 filed on Oct. 2, 2020, the disclosure and content of which is incorporated by reference herein in its entirety.

TECHNICAL FIELD

The present disclosure generally relates to wireless communication networks. In particular, a technique for assessing connection quality in a wireless communication network is presented. The technique may be embodied in methods, computer programs, apparatuses and systems.

BACKGROUND

In the industry, wireless network connectivity increasingly becomes an important element of factory infrastructures and may be used to connect critical machines to controllers and wireless sensors to central control entities, or to connect moving robots, such as Automated Guided Vehicles (AGVs), shipping materials and products throughout the factory, for example. Such use cases generally require highly reliable connectivity providing very low delays (e.g., <1 ms) and very low packet error rates (e.g., $<10^{-6}$) and therefore employ services such as Ultra-Reliable Low-Latency Communication (URLLC) in 5G networks, for example. Network coverage or quality for these types of services cannot be quantified by the traditional signal strength measurements. Rather, network coverage or quality needs to be characterized in terms of delay and loss metrics of URLLC connections at different locations. With such stringent quality requirements, careful network planning and connection assessment becomes increasingly important.

Conventional approaches for network planning and radio surveying are mainly targeted at mobile broadband services, where reliability guarantees and targeted packet error rates are much more relaxed. These services are typically provided on a best effort basis, wherein applications (e.g., web browsing, e-mail or video) are less sensitive to channel variations and may adapt to varying connection quality easily. Network planning and site surveying for such services target an average signal strength that can provide good enough connectivity in average. The planning normally considers shadow fading and signal attenuation via simple models or partly based on floor maps, e.g., assuming some fixed value attenuation by walls, glass, etc. The models can give an average Signal-to-Noise Ratio (SNR) which may be mapped to an average Block Error Rate (BLER), wherein the SNR-BLER mapping model depends on the fast fading properties of the channel which, in turn, may be modeled using some generic statistical models, such as Rayleigh or Price fading models, for example. To obtain the SNR-BLER mapping, offline simulations are employed, and the simulations typically require lengthy simulation runs. Rather than through the use of generic statistical models, the statistical fast fading channel models may also be obtained by assuming a certain delay-spread profile of the channel (i.e., how many and how strong multiple paths are typically received), wherein the profile may be obtained by taking the inverse Fourier transform of the frequency channel impulse response which, in turn, may be measured from reference signals used in Orthogonal Frequency Division Multiplexing (OFDM) systems, for example. If a large number of such channel response measurements can be collected, it is possible to create a statistically relevant representation in the form of a fast fading model, which can then be used in the offline simulations.

These conventional approaches generally suffer from several drawbacks. One drawback is that an estimation of only an averaged quality takes place, which is not sufficient for industry applications requiring high reliability and low latency, as described above, for which rather planning for the worst case is needed. Put in other words, new generation wireless technologies (e.g., 5G and WiFi6) that support more demanding industrial use cases, including URLLC, have more stringent quality requirements, and average signal level measurements taken at a few selected locations are not sufficient to derive satisfying quality metrics.

Another drawback is that either lengthy measurements (to obtain the statistical channel impulse response) as well as lengthy simulations (to obtain the SNR-BLER mapping) need to be performed, or some statistical channel models need to be relied upon, which are not capable of capturing environment-specific properties of the factory and therefore result in rough and inaccurate estimates only. Put in other words, traditional simulation-based estimations are not suitable because they assume some generic statistical channel models which may not fit well to the particular factory environment (thereby falsely estimating the connection quality) or because they require performing lengthy measurements and simulation runs.

For delay-critical traffic, reasonable measurements may not be feasible at all. For delay-critical traffic, the radio channel variability on a timescale of milliseconds may generally impact application Quality of Service (QoS), so that highly detailed channel measurements must be used for RF quality assessment (e.g., in Orthogonal Frequency Division Multiple Access (OFDMA) systems, pilot signal measurements at millisecond and subcarrier level are needed). Although direct measurements of relevant Key Performance Indicators (KPIs), like sudden and large signal drop, are generally possible, these events are—in contrast to average signal strength (e.g., Reference Signal Received Power (RSRP) type) measurements—extremely rare (or "localized") in time and space, e.g., because of the requirement to keep the necessary $10^{-5}$ to $10^{-6}$ loss ratio for URLLC traffic. Moreover, in order to reliably measure these loss metrics, real traffic would need to be injected into the network to be able to realistically measure loss and delay of transmitted data. Effectively, this means that running statistically relevant and exhaustive measurements at a site may be unfeasible for these demanding types of applications.

SUMMARY

Accordingly, there is a need for a technique for assessing connection quality in a wireless communication network which avoids one or more of these problems, and which may be used to ensure sufficient connection quality in the serviced area.

According to a first aspect, a method for assessing connection quality in a wireless communication network is provided. The method comprises obtaining an RF channel response measurement indicative of a channel gain in time and frequency observed at a location covered by the wireless communication network, and determining, based on the RF channel response measurement, an estimated connection quality at the location using a machine learning model trained to map RF channel response measurement based features to corresponding connection qualities.

The channel gain may be measured in time and frequency based on reference symbols transmitted from a base station of the wireless communication network. The RF channel response measurement based features may be representative of channel gain in time and frequency, wherein determining the estimated connection quality based on the RF channel response measurement may include inputting the measured channel gain in time and frequency to the machine learning model. Also, a multipath resolution algorithm may be applied on the RF channel response measurement to determine an observed multipath RF propagation pattern, wherein the RF channel response measurement based features may be representative of multipath RF propagation patterns, and wherein determining the estimated connection quality based on the RF channel response measurement may include inputting the determined multipath RF propagation pattern to the machine learning model. The multipath RF propagation pattern may comprise a number and strength of a plurality of RF propagation paths observed at the location, and optionally a direction of different ones of the plurality of RF propagation paths.

The RF channel response measurement may be obtained from URLLC traffic communicated in the wireless communication network. The machine learning model may be trained using training data comprising a plurality of sets of RF channel response measurement based features as input data, the plurality of sets of RF channel response measurement based features obtained from RF channel response measurements indicative of channel gain in time and frequency performed at different locations covered by a representative wireless communication network, and corresponding connection qualities measured at the different locations as output data. The wireless communication network may cover an industrial environment, wherein additional training data may continuously be obtained from one or more wireless devices carrying out industrial tasks in the industrial environment, and wherein the additional training data may be used to enhance the machine learning model.

The machine learning model may be one of a plurality of machine learning models trained to map RF channel response measurement based features to corresponding connection qualities, wherein each of the plurality of machine learning models may be trained using training data obtained from measurements performed at locations covered by different representative wireless communication networks, each being representative of a different type of RF environment. The machine learning model may be selected from the plurality of machine learning models based on the RF channel response measurement using a classifier trained to map RF channel response measurement based features to corresponding types of RF environments. Also, the plurality of machine learning models may be used as an ensemble in which each of the plurality of machine learning models may be used to estimate a respective connection quality based on the RF channel response measurement, and wherein the estimated connection quality may be determined based on the respective connection qualities.

Obtaining an RF channel response measurement and determining an estimated connection quality may be performed for a plurality of locations covered by the wireless communication network, wherein the resulting estimated connection qualities may be used to generate a connection quality map for an area covered by the wireless communication network. The wireless communication network may cover an industrial environment, wherein measured connection qualities may continuously be obtained from one or more wireless devices carrying out industrial tasks in the industrial environment, and wherein the connection quality map may be updated based on the measured connection qualities. The connection quality map may be segmented into different areas depending on a grade of connection quality that can be provided in the respective area.

When the estimated connection quality is lower than a required connection quality value in an area covered by the wireless communication network, one or more mitigation actions may be triggered to improve connection quality in the area. The one or more mitigation actions may comprise at least one of deploying one or more additional base stations in the area, allocating one or more additional base stations to serve a cell covering the area, adapting an RF reflection property of at least one metasurface provided in the area, and determining a radio link configuration required to achieve the connection quality value in the area and applying the determined radio link configuration in the wireless communication network. Determining the radio link configuration may include adding a safety margin onto channel quality values reported from wireless devices in the wireless communication network, the safety margin accounting for possible drops in channel gain, and selecting a modulation and coding scheme (MCS) depending on the channel quality values with the safety margin.

According to a second aspect, a method for training a machine learning model configured to assess connection quality in a wireless communication network is provided. The method comprises training the machine learning model using training data comprising a plurality of sets of RF channel response measurement based features as input data, the plurality of sets of RF channel response measurement based features being obtained from RF channel response measurements indicative of channel gain in time and frequency performed at different locations covered by a representative wireless communication network, and corresponding connection qualities measured at the different locations as output data.

The method according to the second aspect defines a method dedicated to training a machine learning model which, once it is trained, may be employed for the purpose of assessing connection quality in a wireless communication network in the method according to the first aspect. The machine learning model of the second aspect may thus correspond to the machine learning model described above in relation to the first aspect.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for assessing connection quality in a wireless communication network is provided. The computing unit comprises at least one processor and at least one memory, the at least one memory containing instructions executable by the at least one processor such that the computing unit is operable to perform any of the method steps presented herein with respect to the first aspect.

According to a fifth aspect, a computing unit for training a machine learning model configured to assess connection quality in a wireless communication network is provided. The computing unit comprises at least one processor and at least one memory, the at least one memory containing instructions executable by the at least one processor such that the computing unit is operable to perform any of the method steps presented herein with respect to the second aspect.

According to a sixth aspect, there is provided a computing unit according to the fourth aspect and, optionally, a computing unit according to the fifth aspect.

BRIEF DESCRIPTION OF THE DRAWINGS

Implementations of the technique presented herein are described herein below with reference to the accompanying drawings, in which:

FIGS. 1a and 1b illustrate exemplary compositions of a computing unit for assessing connection quality and a computing unit for training a machine learning model according to the present disclosure;

FIG. 6 illustrates a two-dimensional (2D) plot of channel gain both in time and frequency;

FIG. 10 illustrates a method which may be performed by the computing unit for training a machine learning model according to the present disclosure.

DETAILED DESCRIPTION

Figure 2:
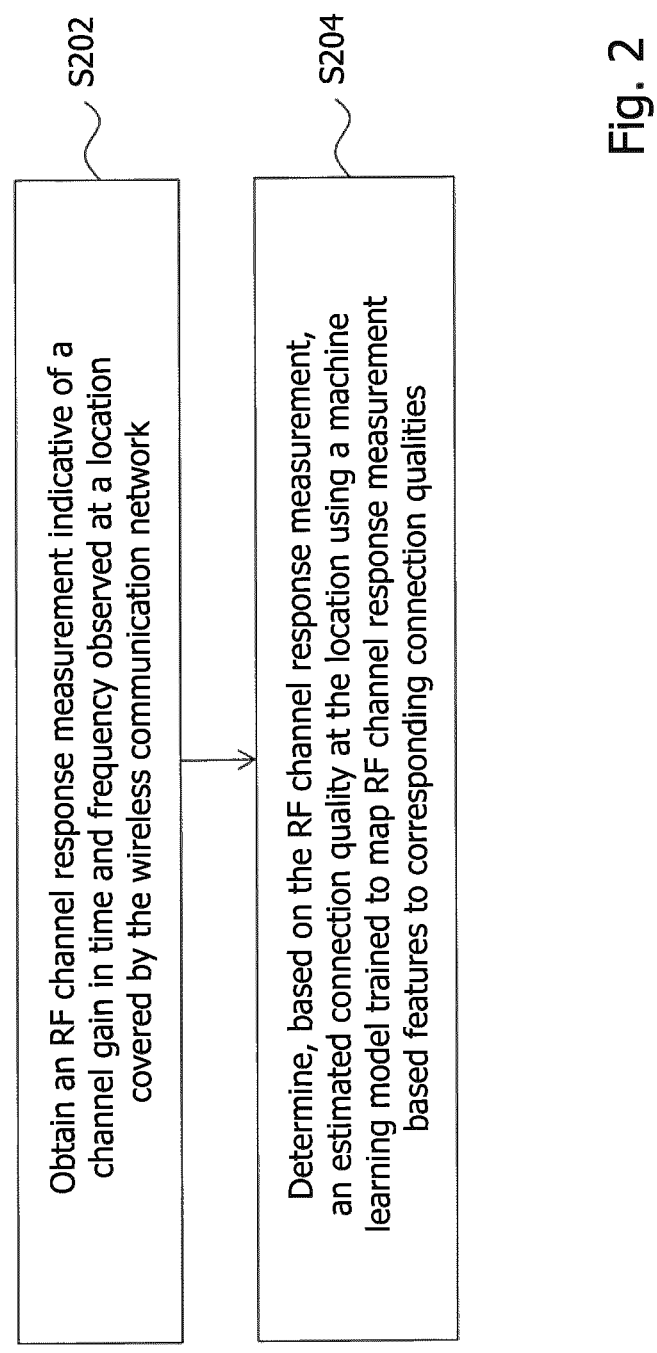
FIG. 2 illustrates a method which may be performed by the computing unit for assessing connection quality according to the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figures 1A, 1B:
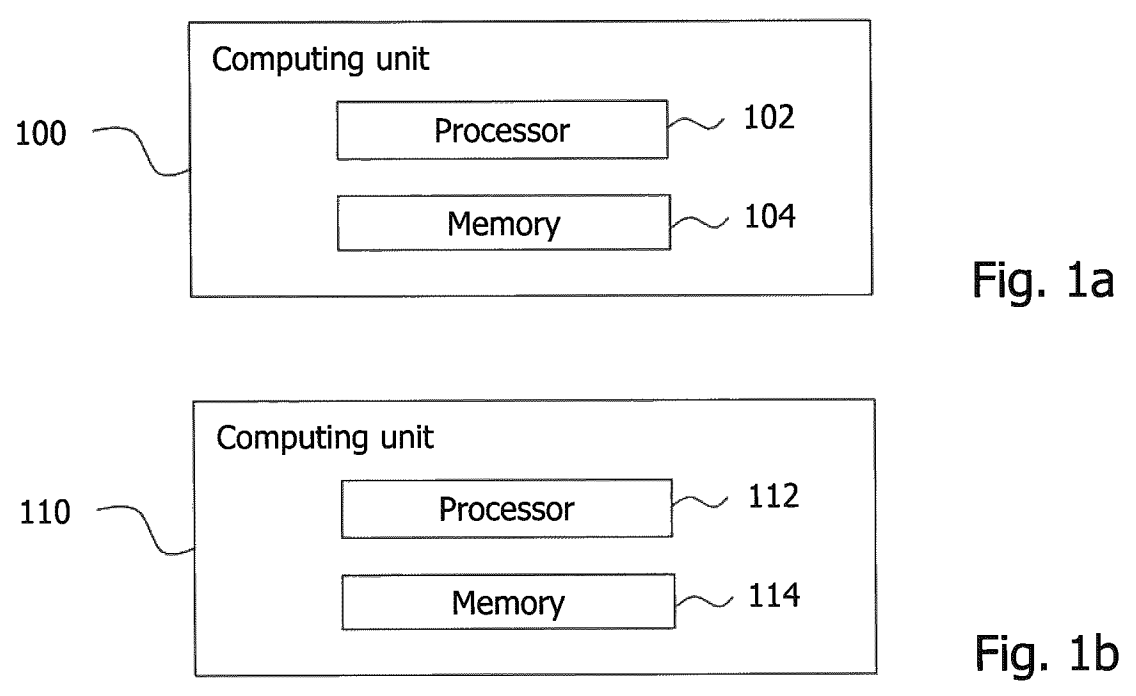

FIG. 1a schematically illustrates an exemplary composition of a computing unit 100 for assessing connection quality in a wireless communication network. The computing unit 100 comprises at least one processor 102 and at least one memory 104, wherein the at least one memory 104 contains instructions executable by the at least one processor 102 such that the computing unit 100 is operable to carry out the method steps described herein below with reference to the computing unit for assessing connection quality.

FIG. 1b schematically illustrates an exemplary composition of a computing unit 110 for training a machine learning model configured to assess connection quality in a wireless communication network. The computing unit 110 comprises at least one processor 112 and at least one memory 114, wherein the at least one memory 114 contains instructions executable by the at least one processor 112 such that the computing unit 110 is operable to carry out the method steps described herein below with reference to the computing unit for training a machine learning model.

It will be understood that each of the computing unit 100 and the computing unit 110 may be implemented on a physical computing unit or a virtualized computing unit, such as a virtual machine, for example. It will further be appreciated that each of the computing unit 100 and the computing unit 110 may not necessarily be implemented on a standalone computing unit, but may be implemented as components—realized in software and/or hardware—residing on multiple distributed computing units as well, such as in a cloud computing environment, for example.

FIG. 2 illustrates a method which may be performed by the computing unit 100 according to the present disclosure. The method is dedicated to assessing connection quality in a wireless communication network. In step S202, the computing unit 100 may obtain an RF channel response measurement indicative of a channel gain in time and frequency observed at a location covered by the wireless communication network. In step S204, the computing unit 100 may determine, based on the RF channel response measurement, an estimated connection quality at the location using a machine learning model trained to map RF channel response measurement based features to corresponding connection qualities.

Connection quality assessment may thus be performed by predicting connection quality from RF channel response features using a machine learning model specifically trained to perform such mapping. Rather than the conventional average signal strength based approaches described above, the technique presented herein may thus use RF channel response measurements with high precision in time and frequency to deduce an estimated channel quality at the observed location.

Figure 3:
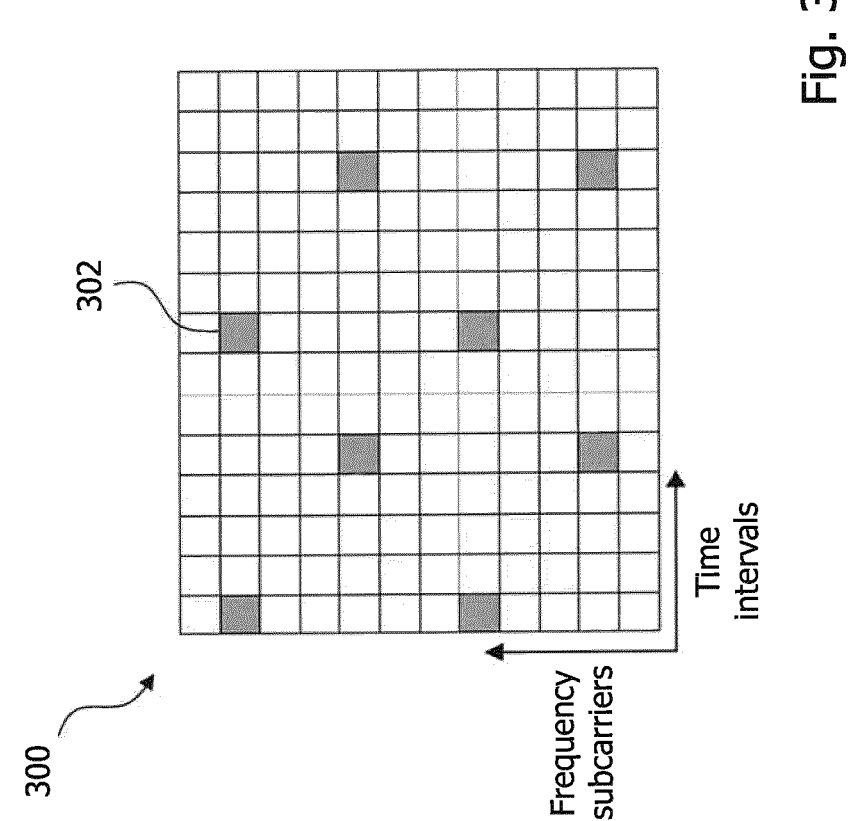
FIG. 3 illustrates an exemplary resource block including reference symbols distributed in the time-frequency grid of the resource block.

As will be appreciated by one of skill in the art, an RF channel response (or "frequency domain channel response") may correspond to the measured (complex valued) channel gain in time and frequency, which may basically represent a measure of the channel distortion observed in fine granularity both in time and frequency of the received signal. The fine granularity (or "high precision") in time and frequency may be achieved by measuring reference symbols transmitted by a base station (or "access point" (AP)) of the wireless communication network to the measuring wireless device, e.g., reference symbols transmitted in designated time-frequency resource blocks, such as Physical Resource Blocks (PRBs), for example. The channel gain may thus be measured in time and frequency based on reference symbols transmitted from a base station of the wireless communication network. An exemplary time-frequency resource block 300 including reference symbols 302 distributed in the time-frequency grid of the resource block 300 is shown in FIG. 3. The RF channel response may be measured at each of the reference symbols 302 in the resource block 300. More specifically, the reference symbols 302 may be transmitted at regular short time intervals (e.g., 1 ms) and at predefined frequency subcarriers in the time-frequency grid and, as the transmitted signal is generally known, the channel distortion can be determined by comparing the received signal against the transmitted signal to thereby obtain a measure for the channel gain. The channel distortion may correspond to the difference between the received signal and the transmitted signal both in the amplitude and the phase of the signal, hence yielding a complex value for the RF channel response.

Figure 4:
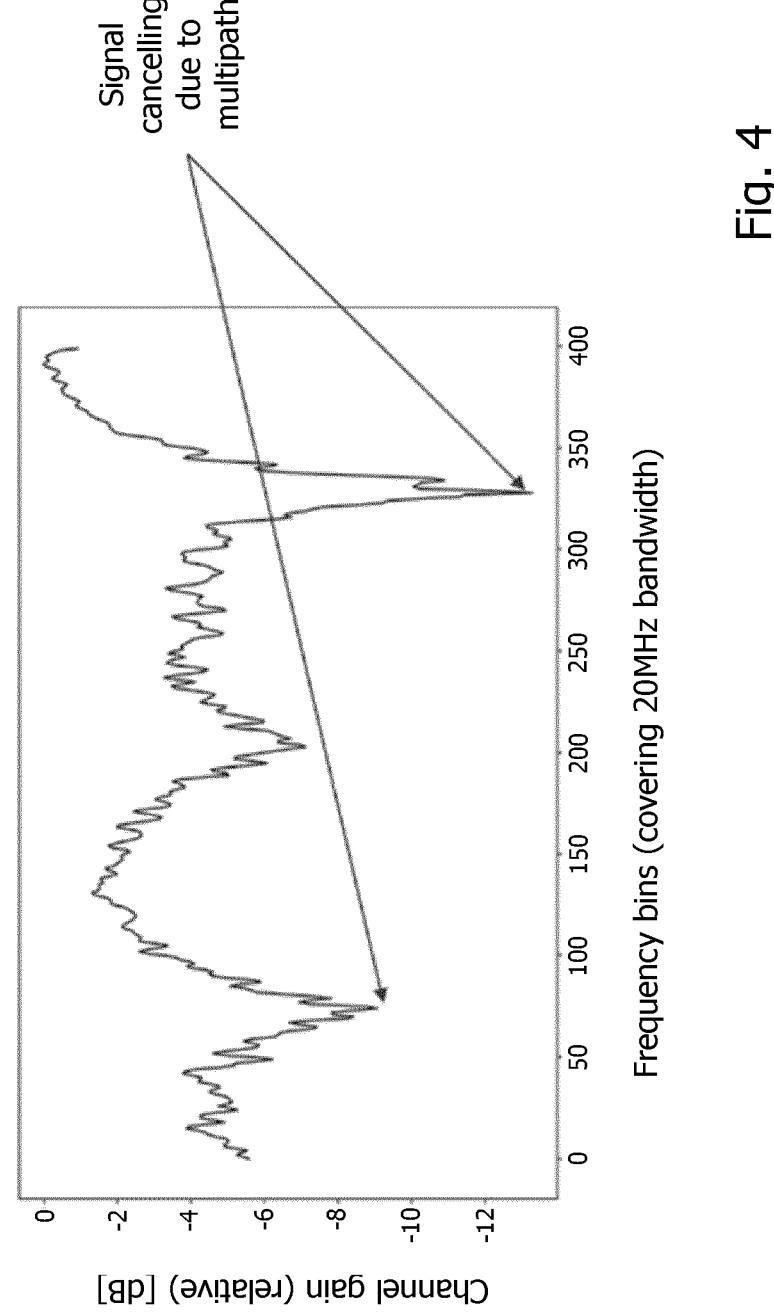
FIG. 4 illustrates an example of a measured RF channel response in the frequency domain.
Figure 5:
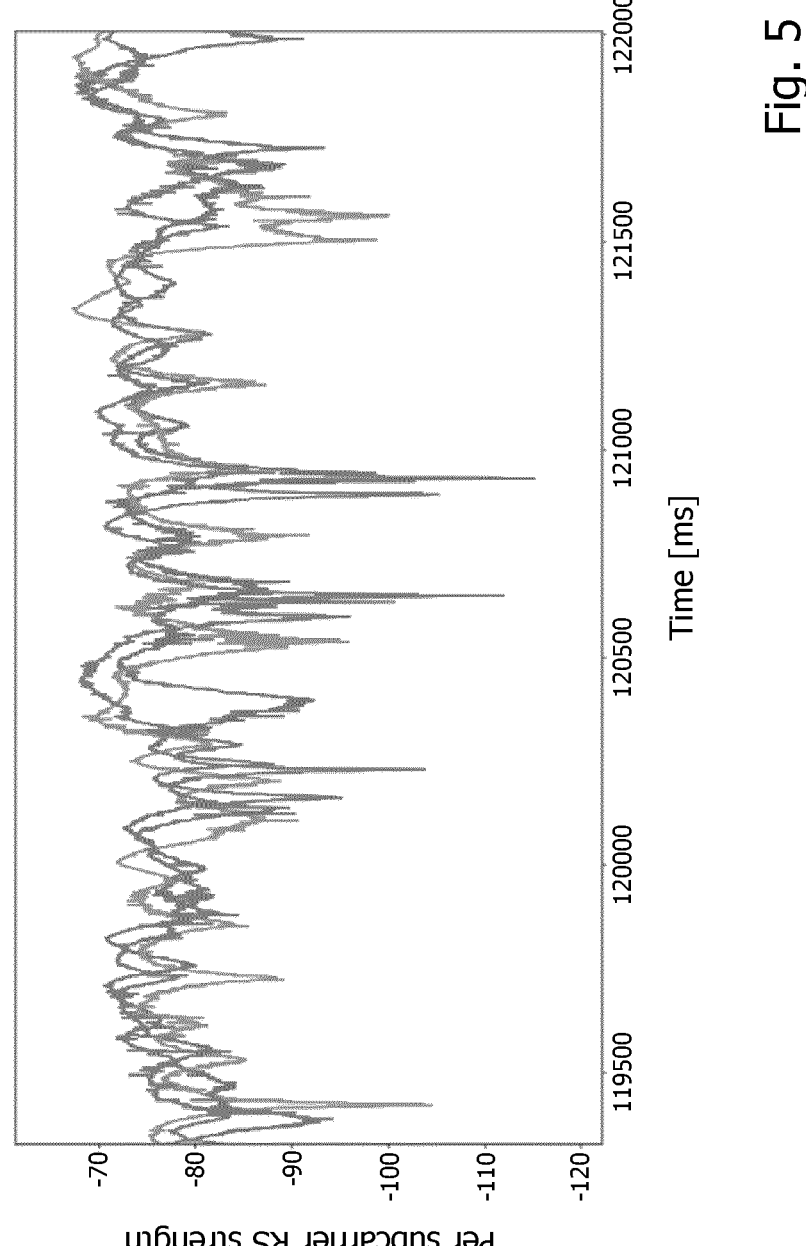
FIG. 5 illustrates an example of a measured RF channel response in the time domain.

FIG. 4 shows an example of a measured channel response in the frequency domain, illustrating the channel gain in one time instant, wherein the X axis indicates the frequency and the Y axis indicates the channel gain. As can be seen, there are frequencies (i.e., frequency subcarriers) where the channel is significantly weaker, which may be caused by severe signal cancellation due to multipath signal propagation patterns, for example. FIG. 5, on the other hand, shows the channel gain over time for a few selected frequency bins (i.e., subcarriers), wherein the X axis indicates the time, the Y axis indicates the channel gain, and the different grey-shaded curves represent the different subcarriers, i.e., the few selected frequency bins. A further possible visualization of the RF channel response is shown in FIG. 6, which illustrates the channel gain both in time and frequency in a 2D plot, wherein the different colored values indicate different values of the channel gain.

Based on such RF channel response measurement results observed at a location, an estimated connection quality may be determined using a machine learning model specifically trained to map RF channel response measurement based features to corresponding connection qualities, as described above. The channel response measurement based features may be any features that correspond to or are derived from RF channel response measurements. In the simplest case, the RF channel response measurement based features may directly correspond to the channel gain in time and frequency of a RF channel response measurement. In other cases, the RF channel response measurement based features may be features that are derived from the RF channel response measurement, such as through the application of a multipath resolution algorithm on the measured channel response data. As one of skill in the art will appreciate, the signal strength dynamics in advanced wireless systems, such as OFDMA systems, may be highly determined by multipath propagation patterns, i.e., by the number, strength and direction of individual signal paths (so called "taps"), for example. These patterns (e.g., together with the observed noise and interference) may determine the KPIs important for critical traffic. The patterns may depend on the local environment, such as reflective objects, walls and other barriers, so that the points that are close in the physical space may generally be exposed to the same or similar multipath propagation characteristics.

Again, in the simplest case, the RF channel response measurement based features may be representative of channel gain in time and frequency. In this case, the step of determining the estimated connection quality based on the RF channel response measurement may include inputting the measured channel gain in time and frequency to the machine learning model. The machine learning model may thus map the measured channel gain in time and frequency (provided as input to the model) to a corresponding estimated connection quality (provided as corresponding output from the model). The machine learning model may be any type of machine learning model suitable to be trained for such mapping, including neural networks, Support Vector Machines (SVMs), or the like. A neural network may especially be given by a Convolutional Neural Network (CNN), a simple Deep Neural Network (DNN), or a Recurrent Neural Network (RNN) like a Long Short-Term Memory (LSTM), for example.

The connection quality determined by the machine learning model based on the input may correspond to a KPI concerning a (wireless) connection established with the measuring wireless device, e.g., a connection of the wireless device with a base station of the wireless communication network, or an application-level connection of a service provided to the measuring wireless device over the wireless communication network. The KPI may as such be related to a particular application, such as a particular industry application, for example. Exemplary KPIs may include at least one of a BLER, a packet delay, a packet delay budget, a probability of packets exceeding a delay of a predetermined threshold, a probability of packet drop, and a grade of connectivity (e.g., from an application point of view). A grade of connectivity may be indicative of different classes of connection quality. As a mere example, three classes of connection quality may be defined, the first class being representative of connections suitable for hard real-time applications (e.g., low level real-time robot motion control), the second class being representative of connections suitable for soft real-time applications (e.g., AGV job control), and the third class being representative of connections suitable for monitoring and/or data collection purposes, for example. The measuring wireless device may be an RF measurement device attached to an indoor positioning device, for example. As a cost-efficient solution with acceptable accuracy, a device with an advanced camera system and Augmented Reality (AR) software support can be used to localize the device in the site area with sub-decimeter accuracy.

As said, in one variant, the RF channel response measurement based features may be representative of the channel gain in time and frequency and, in other variants, the RF channel response measurement based features may be features that are derived from the RF channel response measurement. In one such variant, the RF channel response measurement based features may be obtained by applying a multipath resolution algorithm (or "technique"/"model") on the measured channel response data, which can calculate the number and strength of multiple signal paths, and optionally a direction of the different paths. Exemplary multipath resolution algorithms may comprise a Fourier transform or a Multiple Signal Classification (MUSIC) algorithm. Similar to the input based on the measured channel gain in time and frequency, the determined multipath propagation pattern may likewise be used as input to the machine learning model, provided that the machine learning model has been trained to operate on such input. A multipath resolution algorithm may thus be applied on the RF channel response measurement to determine an observed multipath RF propagation pattern, wherein the RF channel response measurement based features may be representative of multipath RF propagation patterns, and wherein the step of determining the estimated connection quality based on the RF channel response measurement may include inputting the determined multipath RF propagation pattern to the machine learning model. The machine learning model, in turn, may likewise produce an estimated connection quality as the corresponding output. The multipath RF propagation pattern may comprise a number and strength of a plurality of RF propagation paths observed at the location, and optionally a direction of different ones of the plurality of RF propagation paths.

The wireless communication network may be any network which allows determining RF channel response measurements in the manner described above. In particular, the wireless communication network may be a network that supports services for reliable low-latency communication, such as 5G or WiFi6 networks, for example. The supported service may especially be a URLLC service. The RF channel response measurement may thus be obtained from URLLC traffic communicated in the wireless communication network. KPIs concerning the connection and being representative of the connection quality may hence especially correspond to URLLC-related KPIs or, more generally, industrial target KPIs (or "industry relevant KPIs"), for example.

Before the machine learning model may be used for inference to determine estimated connection qualities based on RF channel response measurements, the machine learning model may be trained to carry out such mapping. The machine learning model may be any type of machine learning model suitable to be trained for such mapping, which may especially include models that employ supervised learning. In the training phase, similar measurements as described above may be performed in a representative environment (e.g., at least one representative wireless communication network different from the wireless communication network in which inference is performed) to generate corresponding training data. To train the model, a radio environment covered by the at least one representative wireless communication network may be measured with high precision in time and frequency (i.e., to determine the RF channel responses) at different locations together with the relevant target KPIs, which may be used as labels for the supervised learning. The thus collected training data may correspond to a time sequence of RF channel response measurements obtained at the different locations, and may then be used to train the model using conventional techniques, such as backpropagation, for example. The machine learning model may in other words be trained using training data comprising a plurality of sets of RF channel response measurement based features as input data, wherein the plurality of sets of RF channel response measurement based features may be obtained from RF channel response measurements indicative of channel gain in time and frequency performed at different locations covered by a representative wireless communication network, and corresponding connection qualities measured at the different locations as output data.

When the RF channel response measurement based features directly correspond to channel gain in time and frequency, as described above, a channel response may be stored as a vector of complex numbers, for example, wherein each instance of the vector may correspond to one snapshot of the channel. The training input for the machine learning model may then be a time sequence of such vectors. When the RF channel response measurement based features are representative of multipath RF propagation patterns, on the other hand, feature vectors comprising the number and strength, and optionally the direction, of the multiple paths may be formed and such feature vectors may then be used as training input for the machine learning model. Through the training, the mapping from the channel gain in time and frequency (or the multipath RF propagation patterns, respectively) to the corresponding connection qualities may be learned.

Since industrial environments, such as industrial halls, may change from time to time due to rearrangements of machines, containers or other large objects, for example, it may be conceivable to continuously improve the machine learning model from existing deployments by collecting detailed measurements together with the corresponding connection qualities from communicating devices (e.g., AGVs or robots) in a life running installation. Such devices may run in 24/7 operation and therefore detect even rare events, such as an outage in robot control communication, for example, and associate it with the RF channel response measurements taken at that moment. These RF channel response measurement to connection quality mappings for rare events may then be used to update (or "enhance") the machine learning model, thereby continuously improving the model as more and more deployments are in operation. The wireless communication network may thus cover an industrial environment, wherein additional training data may be continuously obtained from one or more wireless devices carrying out industrial tasks in the industrial environment, wherein the additional training data may be used to enhance the machine learning model.

In a refinement, it may be conceivable to create multiple environment-specific machine learning models from different deployments in order to enable the use of better fitting models in the inference phase. Different types of factories may have different equipment and furniture on the floor, which can significantly impact the radio propagation environment and the resulting connection quality. For example, the propagation of radio signals and the fast fading channel may have fundamentally different characteristics in a factory where large metal parts and machines are deployed, as compared to a semi-conductor factory, or as compared to a warehouse with high shelves all around the place. Therefore, different (i.e., separate) machine learning models for the RF channel response measurement to connection quality mapping may be trained and used for inference, one for each environment type. The machine learning model may thus be one of a plurality of machine learning models trained to map RF channel response measurement based features to corresponding connection qualities, wherein each of the plurality of machine learning models may be trained using training data obtained from measurements performed at locations covered by different representative wireless communication networks, each being representative of a different type of RF environment.

In the inference phase, the machine learning model that fits best to the location at which the RF channel response measurement is taken may be selected for the actual inference. For example, in a radio survey for a factory, a few RF channel response measurements may be taken only and, based on these measurements, the best fitting machine learning model to be used for the prediction of the connection quality may be determined. Once determined, the prediction may be performed using the selected model. For the selection of the appropriate machine learning model, it may be conceivable to train a separate machine learning model (e.g., a neural network) that classifies the RF channel response measurement inputs into corresponding environment type categories and, then, the machine learning model corresponding to the determined category may be selected to predict the connection quality. In this variant, the machine learning model may be selected from the plurality of machine learning models based on the RF channel response measurement using a classifier trained to map RF channel response measurement based features to corresponding types of RF measurements.

In another variant, an ensemble based machine learning technique may be employed, wherein multiple machine learning models may be used in parallel to predict corresponding connection qualities based on the RF channel response measurement, and wherein the final estimate of the connection quality may be made based on an aggregation of the outputs of the parallel models, for example. The aggregation may involve selecting one output from the multiple parallel models (e.g., based on some confidence or probability estimate for each output), or the aggregation may involve a majority-based decision. In this variant, the plurality of machine learning models may therefore be used as an ensemble in which each of the plurality of machine learning models is used to estimate a respective connection quality based on the RF channel response measurement, wherein the estimated connection quality may be determined based on the respective connection qualities. A widely known ensemble based algorithm is the AdaBoost algorithm, for example.

In the above description of the inference phase, the technique presented herein has been presented with reference to predicting the channel quality for a single location in the area covered by the wireless communication network. It will be understood, however, that the technique may be employed to assess the whole (or a larger portion of the) environment and, therefore, the RF channel response measurements may be collected at multiple locations in the area to thereby create a map indicative of connection qualities in the surveyed area. Obtaining an RF channel response measurement and determining an estimated connection quality may thus be performed for a plurality of locations covered by the wireless communication network, wherein the resulting estimated connection qualities may be used to generate a connection quality map for an area covered by the wireless communication network. Since the environment may change from time to time due to rearrangements of machines, containers or large objects, as described above, it may be conceivable to handle such variability by running a continuous monitoring of the environment using measurement devices attached to moving devices in the area, such as moving robots, AGVs or drones, for example. The collected new reference data may then be used to update the map. The wireless communication network may thus cover an industrial environment, wherein measured connection qualities may be continuously obtained from one or more (e.g., movable) wireless devices carrying out industrial tasks in the industrial environment, and wherein the connection quality map may be updated based on the measured connection qualities.

Figure 7:
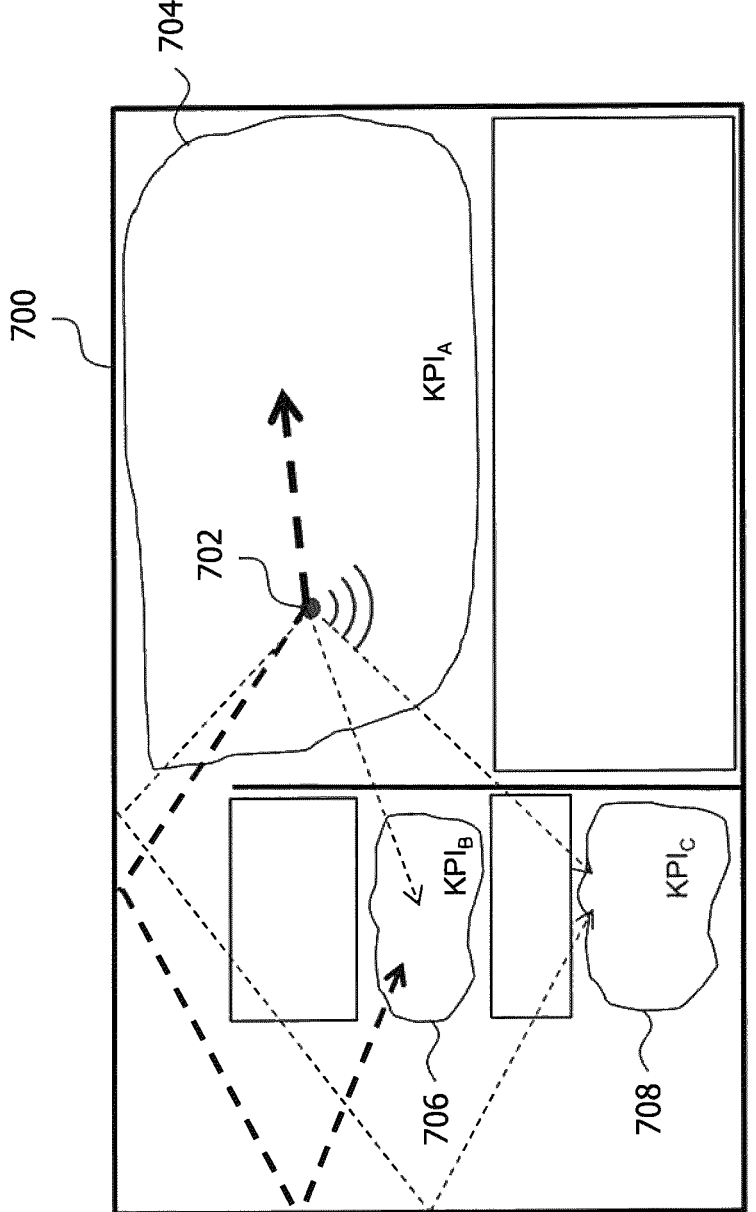
FIG. 7 illustrates an exemplary environment with areas of different multipath propagation patterns.

Once the connection quality map is created, it may be segmented into different subareas that may be characterized by the same or at least similar connection quality. The connection quality map may thus be segmented into different areas depending on a grade of connection quality that can be provided in the respective area. The grade of connection quality may correspond to a certain degree of connection quality (e.g., a degree of at least one of BLER, packet delay, packet delay budget, probability of packets exceeding a delay of a predetermined threshold, probability of packet drop, and grade of connectivity), or to a class of connection quality in the above-described sense. FIG. 7 illustrates an exemplary connection quality map 700 of an industry hall with areas of different multipath propagation patterns. In the shown example, the signal paths originating from base station 702 are propagated along multiple paths with different strengths and directions, wherein the resulting connection quality map 700 exposes three segmented areas 704, 706 and 708, each having different grades of connection quality KPIA, KPIB and KPIc. The connection quality map 700 may have been created by a radio survey taken by walking around in the area, recording the RF channel measurement responses with a measuring device, and inferring corresponding channel qualities using a machine learning model, to thereby characterize the areas 704, 706 and 708 with different RF complexity based on the detected multipath features.

When the predicted connection quality is lower than a required connection quality in any of such areas, e.g., when an area is identified with low KPI values for sensitive traffic, then corresponding countermeasures can be taken to improve the connection quality in the concerned area. When the estimated connection quality is thus lower than a required connection quality value in an area covered by the wireless communication network, one or more mitigation actions may be triggered to improve connection quality in the area. Such actions may include identifying weak spots to deploy a new base station (or AP), or identifying reconfiguration actions or radio mitigation actions needed to achieve the desired connection qualities. The one or more mitigation actions may comprise at least one of deploying one or more additional base stations in the area, allocating one or more additional base stations to serve a cell covering the area, adapting an RF reflection property of at least one metasurface provided in the area, and determining a radio link configuration required to achieve the connection quality value in the area and applying the determined radio link configuration in a wireless communication network.

The action of allocating one or more additional base stations to serve a cell covering the area may relate to use cases in which an area is covered by a dense deployment of APs (e.g., using the Ericsson Dot system). In such use case, decreasing small-scale fading variability (so called "channel hardening") may be achieved by allocating more APs to serve the same cell. In such a deployment, each cell may be served by multiple APs and the assignment of an AP to a cell may be reconfigured, leading to a change of the cell coverage areas or borders. Multiple APs serving the same cell may provide transmit diversity by sending signals over multiple channels with independent realizations, which may be key to combating small-scale fading. If an identified location with low connection quality for critical (e.g., delay-sensitive) traffic is close to the cell edge, reconfiguring the allocation of APs serving the cell may effectively increase channel quality in that area.

Figure 8:
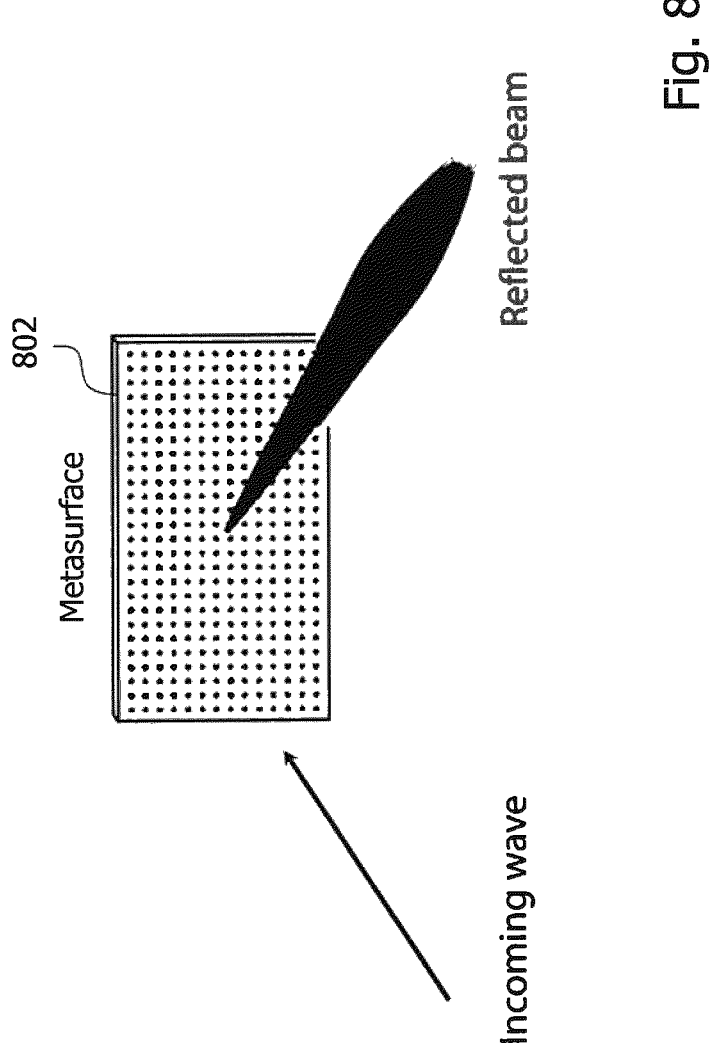
FIG. 8 illustrates a metasurface controlling the direction of a reflected signal.

The action of adapting an RF reflection property of at least one metasurface provided in the area may relate to use cases in which the radio environment is dynamically optimized through software-controlled metasurfaces whose RF reflection properties can be dynamically adapted to positively influence or optimize the radio environment in the target area. As exemplarily illustrated in FIG. 8, a metasurface 802 may control the direction of the signal it reflects (e.g., by adding controlled phase shifts/delay to the incoming signal), so that the resulting sum of signals for the intended receiver can be influenced in a favorable way. In case the incoming signals are found to be highly variable and in case the multipath environment is found rather unfavorable for a high grade quality connection (e.g., as determined by the machine learning model), the signal reflections, and accordingly the multipath environment, may be improved by control of the metasurface 802 by a metasurface application.

Figure 9:
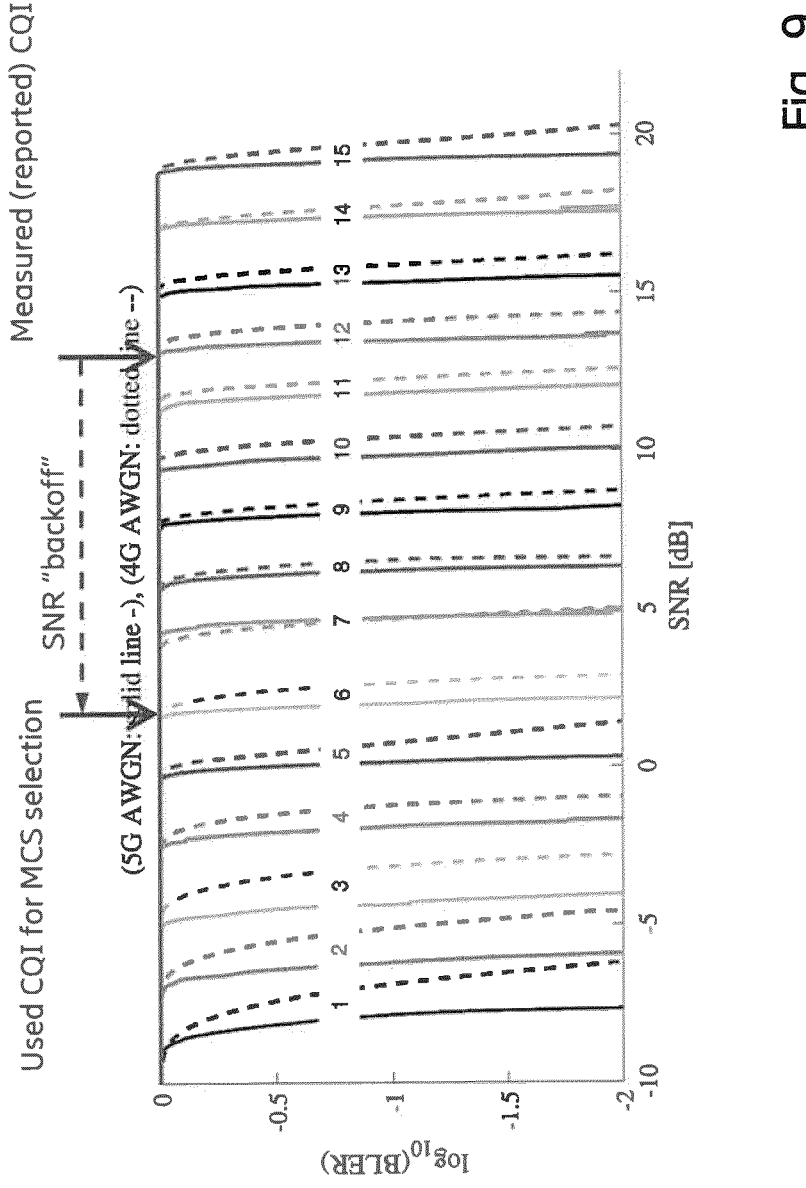
FIG. 9 illustrates an exemplary SNR-to-BLER curve for different MCSs.

The action of determining a radio link configuration required to achieve the desired connection quality value in the area and applying the determined radio link configuration in the wireless communication network may relate to use cases in which a more suitable radio link configuration (e.g., changing the MCS) is determined, e.g., based on fast fading channels fluctuations. In such a case, to achieve a desired BLER, a safety margin may be added onto the Channel Quality Indicator (CQI) reported by the wireless device (e.g., a User Equipment (UE)) in order to account for a possible abrupt change of the channel gain. If a sudden channel drop of e.g. 10 dB occurs with a probability of $10^{-6}$, then, if the BLER is to be kept below $10^{-6}$, a 10 dB margin may be added to the reported CQI, and a corresponding MCS may be selected accordingly. Determining the radio link configuration may thus include adding a safety margin onto channel quality values (e.g., CQI) reported from wireless devices in the wireless communication network, the safety margin accounting for possible drops in channel gain, and selecting a MCS depending on the channel quality values with the safety margin. The CQI backoff to be applied on the communication channel and the particular radio environment may be determined by a machine learning model, for example. FIG. 9 illustrates an exemplary SNR-to-BLER curve for different MCSs. If the amount of signal drop that may occur with a certain probability is known from the measurements and the machine learning model, then the same amount of CQI/SNR backoff and "jump" to a more conservative modulation and coding MCS curve may be applied. It will be understood that such CQI backoff estimation is merely exemplary and provides a way to estimate how the performance would change if the system configuration is changed. It is noted that this can be estimated without making any new measurements.

FIG. 10 illustrates a method which may be performed by the computing unit 110 according to the present disclosure. The method is dedicated to training a machine learning model configured to assess connection quality in a wireless communication network. In step S1002, the computing unit 110 may train the machine learning model using training data comprising a plurality of sets of RF channel response measurement based features as input data, the plurality of sets of RF channel response measurement based features being obtained from RF channel response measurements indicative of channel gain in time and frequency performed at different locations covered by a representative wireless communication network, and corresponding connection qualities measured at the different locations as output data. The method according to FIG. 10 defines a method dedicated to train a machine learning model which, once it is trained, may be employed for the purpose of assessing connection quality in accordance with the method described above in relation to FIG. 2. As such, aspects described above with regard to the training of the machine learning model used in the method of FIG. 2 may be applicable to the operation of the computing unit 110 as well. Unnecessary repetitions are thus omitted at this point.

Figure 11:
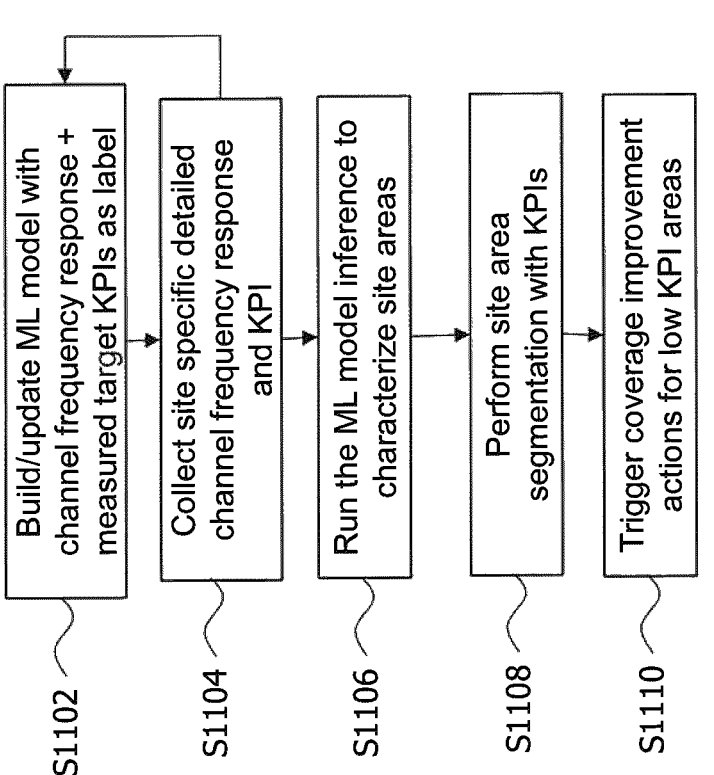
FIG. 11 illustrates a flowchart which provides an overview of relevant steps that may be performed by the technique presented herein.

FIG. 11 illustrates a flowchart which summarizes the method described above, providing an overview of relevant steps that may be performed. In step S1102, in the training phase, a machine learning model may be generated and trained using RF channel response measurements and corresponding measured connection qualities (indicated by KPIs in the figure). In step S1104, site-specific RF channel response measurements and corresponding KPIs may be collected going forward to update the machine learning model (cf. arrow going back to step S1102). In step S1106, in the inference phase, the trained machine learning model may be used to characterize the site areas (e.g., by walking around in the areas and inferring corresponding KPIs). In step S1108, site area segmentation may be performed using the determined KPIs. In step S1110, coverage improvement actions may then be triggered for areas exhibiting lower KPIs as desired.

As has become apparent from the above, the present disclosure provides a technique for assessing connection quality in a wireless communication network. The technique may be directed to ensuring good/sufficient connection quality in a service area covered by a wireless communication network, coping with the need for a measurement mechanism to collect more detailed information about the radio propagation environment (e.g., reflections, multipath, etc.) and connect these RF properties to higher-level (e.g., URLLC) performance estimations. The technique may build machine learning models mapping the measured time-frequency channel response to predicted (e.g., URLLC type of) KPIs and may use the machine learning models to assess the radio environment from an industry application point of view. The technique may be considered as a two-phased (i.e., learning and inference) measurement approach for reliable low-latency traffic coverage assessment. Based on the predicted target KPIs quality, various mitigation actions may be performed, including network reconfigurations and deployment extensions to improve quality in areas with lower KPIs.

The technique may enable a fast coverage estimation without the need for lengthy simulation runs or lengthy traffic measurements that would otherwise be needed, i.e., to measure rare events in a statistically reliable manner. The machine learning model may take into account location and environment-specific propagation properties, making the prediction more accurate as compared to estimates and simulations based on the generic statistical channel models known from conventional techniques. The technique may enable estimating stringent industrial connection quality KPIs from a few time-frequency channel measurement samples. Channel assessment may be done in real-time, such that the quality may be estimated online as the measurements are being collected, which may enable new ways of radio survey implementations (e.g., real-time surveys). The estimations may be more accurate than simulation or generic statistical model-based approaches since the best matching machine learning model may be selected from an ever growing set of measurements of already existing deployments. This "knowledge base" of machine learning models may continually grow, making predictions and models fit better and better as more deployments are measured. Using the presented technique, there may also be no need for radio experts to plan or assess a deployment, as virtually anyone can perform the measurements while the machine learning model evaluates radio connectivity robustness using the relevant KPIs.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for assessing connection quality in a wireless communication network, the method comprising:

obtaining a radio frequency, RF, channel response measurement indicative of a channel gain in time and frequency observed at a location covered by the wireless communication network;

determining, based on the RF channel response measurement, an estimated connection quality at the location using a machine learning model trained to map RF channel response measurement based features to corresponding connection qualities;

the machine learning model being one of a plurality of machine learning models trained to map RF channel response measurement based features to corresponding connection qualities, each of the plurality of machine learning models being trained using training data obtained from measurements performed at locations covered by different representative wireless communication networks, each being representative of a different type of RF environment; and the plurality of machine learning models being used as an ensemble in which each of the plurality of machine learning models is used to estimate a respective connection quality based on the RF channel response measurement, and the estimated connection quality being determined based on the respective connection qualities.

2. The method of claim 1, wherein the channel gain is measured in time and frequency based on reference symbols transmitted from a base station of the wireless communication network.

3. The method of claim 1, wherein the RF channel response measurement based features are representative of channel gain in time and frequency, and wherein determining the estimated connection quality based on the RF channel response measurement includes inputting the measured channel gain in time and frequency to the machine learning model.

4. The method of claim 1, wherein a multipath resolution algorithm is applied on the RF channel response measurement to determine an observed multipath RF propagation pattern, wherein the RF channel response measurement based features are representative of multipath RF propagation patterns, and wherein determining the estimated connection quality based on the RF channel response measurement includes inputting the determined multipath RF propagation pattern to the machine learning model.

5. The method of claim 4, wherein the multipath RF propagation pattern comprises a number and strength of a plurality of RF propagation paths observed at the location, and optionally a direction of different ones of the plurality of RF propagation paths.

6. The method of claim 1, wherein the RF channel response measurement is obtained from Ultra-Reliable Low-Latency Communication, URLLC, traffic communicated in the wireless communication network.

7. The method of claim 1, wherein the machine learning model is trained using training data comprising a plurality of sets of RF channel response measurement based features as input data, the plurality of sets of RF channel response measurement based features obtained from RF channel response measurements indicative of channel gain in time and frequency performed at different locations covered by a representative wireless communication network, and corresponding connection qualities measured at the different locations as output data.

8. The method of claim 7, wherein the wireless communication network covers an industrial environment, wherein additional training data is continuously obtained from one or more wireless devices carrying out industrial tasks in the industrial environment, and wherein the additional training data is used to enhance the machine learning model.

9. The method of claim 1, wherein the machine learning model is selected from the plurality of machine learning models based on the RF channel response measurement using a classifier trained to map RF channel response measurement based features to corresponding types of RF environments.

10. The method of claim 1, wherein obtaining the RF channel response measurement and determining the estimated connection quality is performed for a plurality of locations covered by the wireless communication network, and wherein the resulting estimated connection qualities are used to generate a connection quality map for an area covered by the wireless communication network.

11. The method of claim 10, wherein the wireless communication network covers an industrial environment, wherein measured connection qualities are continuously obtained from one or more wireless devices carrying out industrial tasks in the industrial environment, and wherein the connection quality map is updated based on the measured connection qualities.

12. The method of claim 10, wherein the connection quality map is segmented into different areas depending on a grade of connection quality that can be provided in the respective area.

13. The method of claim 1, wherein, when the estimated connection quality is lower than a required connection quality value in an area covered by the wireless communication network, one or more mitigation actions are triggered to improve connection quality in the area.

14. The method of claim 13, wherein the one or more mitigation actions comprise at least one of:

deploying one or more additional base stations in the area, allocating one or more additional base stations to serve a cell covering the area, adapting an RF reflection property of at least one metasurface provided in the area, and determining a radio link configuration required to achieve the connection quality value in the area and applying the determined radio link configuration in the wireless communication network.

15. The method of claim 14, wherein determining the radio link configuration includes adding a safety margin onto channel quality values reported from wireless devices in the wireless communication network, the safety margin accounting for possible drops in channel gain, and selecting a modulation and coding scheme, MCS, depending on the channel quality values with the safety margin.

16. A method for training a machine learning model configured to assess connection quality in a wireless communication network, the method comprising:

training the machine learning model using training data comprising a plurality of sets of RF channel response measurement based features as input data, the plurality of sets of RF channel response measurement based features being obtained from RF channel response measurements indicative of channel gain in time and frequency performed at different locations covered by a representative wireless communication network, and corresponding connection qualities measured at the different locations as output data;

the machine learning model being one of a plurality of machine learning models trained to map RF channel response measurement based features to corresponding connection qualities, each of the plurality of machine learning models being trained using training data obtained from measurements performed at locations covered by different representative wireless communication networks, each being representative of a different type of RF environment; and the plurality of machine learning models being used as an ensemble in which each of the plurality of machine learning models is used to estimate a respective connection quality based on the RF channel response measurement, and the estimated connection quality being determined based on the respective connection qualities.

17. A computing device for assessing connection quality in a wireless communication network, the computing device comprising at least one processor and at least one memory, the at least one memory containing instructions executable by the at least one processor such that the computing device is operable to perform operations comprising:

obtain a radio frequency, RF, channel response measurement indicative of a channel gain in time and frequency observed at a location covered by the wireless communication network;

determine, based on the RF channel response measurement, an estimated connection quality at the location using a machine learning model trained to map RF channel response measurement based features to corresponding connection qualities;

the machine learning model being one of a plurality of machine learning models trained to map RF channel response measurement based features to corresponding connection qualities, each of the plurality of machine learning models being trained using training data obtained from measurements performed at locations covered by different representative wireless communication networks, each being representative of a different type of RF environment; and the plurality of machine learning models being used as an ensemble in which each of the plurality of machine learning models is used to estimate a respective connection quality based on the RF channel response measurement, and the estimated connection quality being determined based on the respective connection qualities.

18. A computing device for training a machine learning model configured to assess connection quality in a wireless communication network, the computing device comprising at least one processor and at least one memory, the at least one memory containing instructions executable by the at least one processor such that the computing device is operable to perform operations comprising:

train the machine learning model using training data comprising a plurality of sets of RF channel response measurement based features as input data, the plurality of sets of RF channel response measurement based features being obtained from RF channel response measurements indicative of channel gain in time and frequency performed at different locations covered by a representative wireless communication network, and corresponding connection qualities measured at the different locations as output data;

the machine learning model being one of a plurality of machine learning models trained to map RF channel response measurement based features to corresponding connection qualities, each of the plurality of machine learning models being trained using training data obtained from measurements performed at locations covered by different representative wireless communication networks, each being representative of a different type of RF environment; and the plurality of machine learning models being used as an ensemble in which each of the plurality of machine learning models is used to estimate a respective connection quality based on the RF channel response measurement, and the estimated connection quality being determined based on the respective connection qualities.

* * * * *